(12) United States Patent
Lee et al.

(10) Patent No.: US 9,621,759 B2
(45) Date of Patent: Apr. 11, 2017

(54) SYSTEMS AND METHODS FOR PROVIDING TIMESTAMPING MANAGEMENT FOR ELECTRONIC PHOTOGRAPHS

(75) Inventors: Jeffery T. Lee, Cupertino, CA (US); Michael I. Ingrassia, Jr., Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1172 days.

(21) Appl. No.: 12/987,050

(22) Filed: Jan. 7, 2011

(65) Prior Publication Data

US 2012/0176504 A1   Jul. 12, 2012

(51) Int. Cl.
   *H04N 1/32*   (2006.01)
   *G11B 27/32*  (2006.01)
   *G06F 17/30*  (2006.01)

(52) U.S. Cl.
   CPC ... *H04N 1/32101* (2013.01); *G06F 17/30265* (2013.01); *G11B 27/322* (2013.01); *H04N 2201/3215* (2013.01); *H04N 2201/3274* (2013.01)

(58) Field of Classification Search
   CPC ........................................... H04N 5/76
   USPC ........ 348/222.1, 231.2, 231.3, 231.5, 231.99
   See application file for complete search history.

(56) References Cited

U.S. PATENT DOCUMENTS

| | | | |
|---|---|---|---|
| 5,617,141 A * | 4/1997 | Nishimura et al. ........... 348/366 |
| 6,819,356 B1 * | 11/2004 | Yumoto ..................... 348/231.2 |
| 7,714,910 B2 | 5/2010 | Hirata | |
| 7,970,240 B1 * | 6/2011 | Chao et al. .................... 382/305 |
| 2005/0110880 A1 * | 5/2005 | Parulski et al. ........... 348/231.5 |
| 2005/0151849 A1 * | 7/2005 | Fitzhugh et al. ........ 348/207.99 |
| 2006/0268119 A1 * | 11/2006 | Sugawara .................. 348/223.1 |
| 2007/0189333 A1 * | 8/2007 | Naaman et al. .............. 370/477 |
| 2008/0125996 A1 * | 5/2008 | Fitzhugh .............. G11B 27/034 702/89 |
| 2008/0292196 A1 * | 11/2008 | Jain ................... G06F 17/30265 382/225 |
| 2010/0287485 A1 * | 11/2010 | Bertolami et al. ............ 715/764 |
| 2011/0087666 A1 * | 4/2011 | Chou ................ G06F 17/30247 707/737 |
| 2011/0149086 A1 * | 6/2011 | Winbush, III ............. 348/207.1 |
| 2011/0267492 A1 * | 11/2011 | Prentice et al. ........... 348/223.1 |
| 2011/0292221 A1 * | 12/2011 | Gu et al. .................... 348/207.1 |
| 2012/0106854 A1 * | 5/2012 | Tang et al. .................... 382/224 |

* cited by examiner

*Primary Examiner* — Twyler Haskins
*Assistant Examiner* — Akshay Trehan
(74) *Attorney, Agent, or Firm* — Blank Rome LLP

(57) ABSTRACT

Systems and methods are provided for revising the time associated with a digital photograph. A digital photograph and data representing an initial time the photograph was taken may not correspond with identified temporal information. In response, a revised time may be generated based on the temporal information and associated with the digital photograph.

22 Claims, 7 Drawing Sheets

SYSTEMS AND METHODS FOR PROVIDING TIMESTAMPING MANAGEMENT FOR ELECTRONIC PHOTOGRAPHS

BACKGROUND

The present disclosure is generally directed to managing digital photographs and, more particularly, to identifying the time at which a digital photograph was taken.

With the promulgation of modern consumer electronics, photography has become increasingly dominated by digital cameras. A digital camera is a device that captures photographs, video, or both using an electronic image sensor. Many digital cameras store image, video, and audio data with associated metadata, such as, for example, aperture, exposure time, focal length, date and time taken, and location. Some digital cameras store this data in the exchangeable image file format (Exif) image file format.

Many digital cameras provide the date and time a photograph is taken based on an internal clock as part of the photograph's metadata. This is sometimes referred to as a timestamp. Because a timestamp is the time at which the digital photograph is recorded by the digital camera and not necessarily the actual time that the photograph was taken, the difference in recorded and actual times may be substantial. For example, a camera user may forget to adjust the time on a digital camera when traveling outside of the camera's default geographic region or time zone. This may result in a photograph that was taken during daylight hours having a timestamp indicative of capture during nighttime hours. In another example, a camera user may forget to set the time on a new digital camera, resulting in digital photographs having the wrong date, time, or both. These discrepancies may increase the difficulty a user faces when trying to determine the actual time that a digital photograph was taken.

SUMMARY OF THE DISCLOSURE

In some embodiments, systems and methods are provided for revising the time associated with a digital photograph. A digital photograph and data representing an initial time the photograph was taken may be received and processed to identify temporal information corresponding to the time the photograph was taken. When the initial time does not correspond to the temporal information, a revised time may be generated based on the temporal information and associated with the digital photograph.

BRIEF DESCRIPTION OF THE DRAWINGS

Features of the disclosure, its nature, and various advantages will be apparent upon consideration of the following detailed description, taken in conjunction with the accompanying drawings, in which like reference characters refer to like parts throughout, and in which.

DETAILED DESCRIPTION OF EMBODIMENTS

Figure 1:
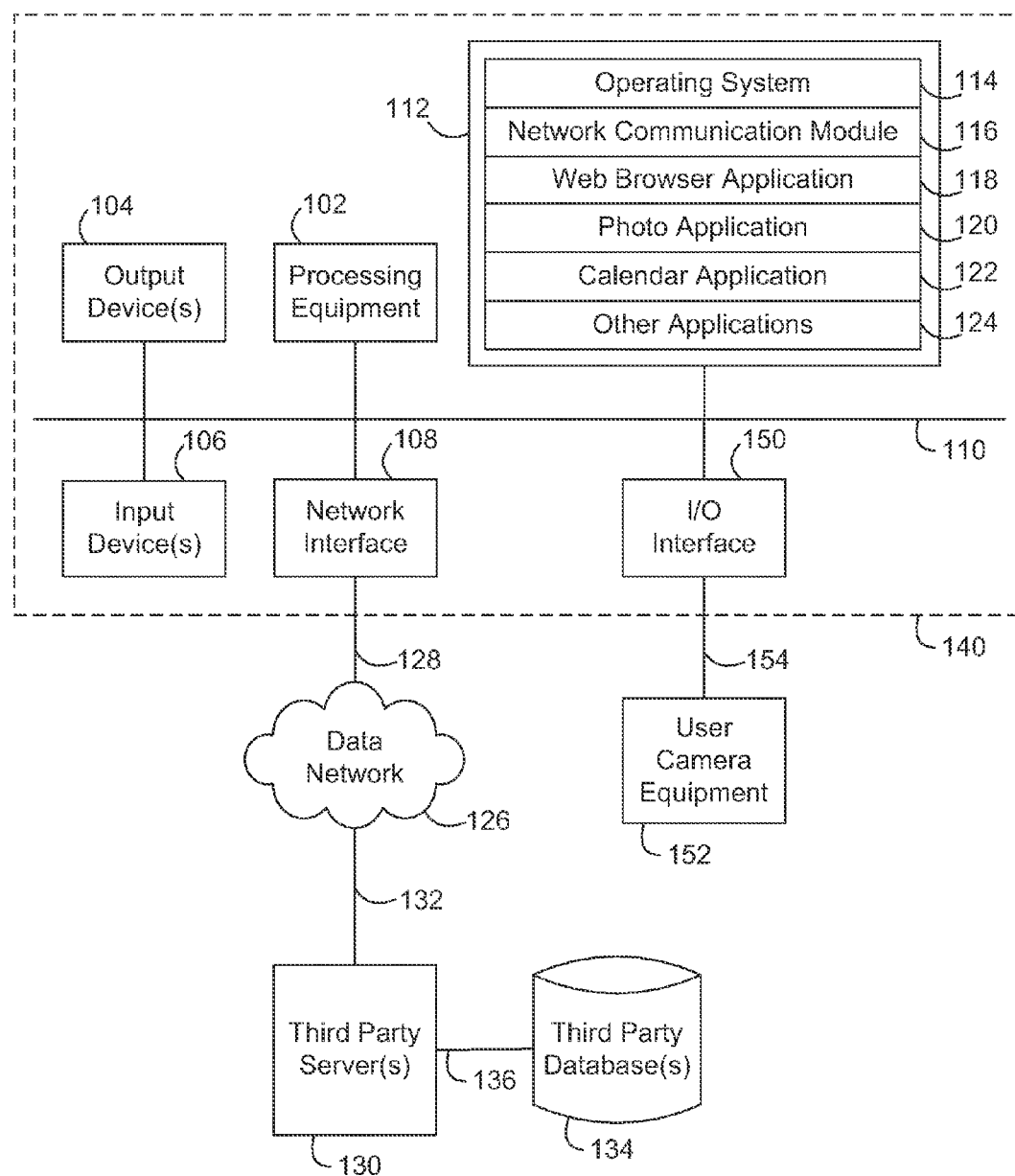
FIG. 1 is a block diagram of an illustrative timestamping management system in accordance with some embodiments.

The timestamping management systems and methods of the present disclosure may be used for identifying, revising, or otherwise correcting the time a digital photograph was taken. The features of the present disclosure are generally described in the context of a timestamping management application. A timestamp is any suitable information that may be used to identify the time at which a digital photograph was taken. For example, a timestamp may be a sequence of characters that corresponds to the date, time, or both at which a digital photograph was taken as recorded by a digital camera. Timestamps may be generally provided in a consistent format, such "2010-01-03 T 01:23 UTC" or "Fri Jan 03 01:23:45 2010," in order to allow for ease of comparison of various data files. The process of recording timestamps along with the image, video, or audio data is referred to as timestamping.

A timestamping management application may be any suitable software, hardware, or both for implementing and performing the functionality described in the present disclosure. For example, the timestamping management application may be a photo application, photo application plug-in or feature, calendar plug-in or feature, web browser plug-in or feature, stand-alone application, any other suitable application, plug-in, or feature, or any combination thereof.

The timestamping management application may receive a photograph and data representing an initial time associated with the photograph (e.g., a timestamp). The data may be any suitable information, such as metadata, Exif data, sensor data, clock data, network data, any other suitable data, or any combination thereof. In some embodiments, the timestamping management application may identify temporal information indicative of the time of day the photograph was taken. In some embodiments, the temporal information may be indicative of an estimate of the time of day, a particular portion of the time of day, a specific time, time zone, any other suitable information, or any combination thereof. The temporal information may be based on, for example, the color temperature of the photograph, camera settings, Global Positioning System (GPS) signal strength, audio information, location information, user calendar information, user social network information, GPS information, other image analysis information (e.g., temporal information corresponding to an analog or digital clock in a photograph), any other suitable attribute, or any combination thereof.

In some embodiments, the temporal information may correspond to a particular portion of the day (e.g., dawn, day, dusk, night, or any other suitable portion of the day) based on, for example, color temperature information and information indicative of whether the photograph was taken indoors or outdoors.

In some embodiments, the timestamping management application may analyze a photograph to determine whether it was taken indoors or outdoors based on the type of lighting (e.g., daylight, incandescent light, fluorescent light, any other suitable lighting, or any combination thereof) that was used when the photograph was taken. For example, the timestamping management application may analyze a photograph to determine the color temperature of the photograph in order to determine the type of lighting that was used. In an example, the timestamping management application may determine that a photograph with a color temperature of 2700 K may have been taken indoors using incandescent lighting conditions.

In some embodiments, the timestamping management application may analyze a photograph to determine whether it was taken indoors or outdoors based on the camera settings that were used when the photograph was taken. Camera settings may include, for example, mode, flash, shutter, aperture, exposure, ISO, focal length, focal ratio, depth of field, color temperature, white balance, sensitivity, resolution, any other suitable setting or attribute, or any combination thereof. For example, the timestamping management application may analyze a photograph to determine whether a daytime, nighttime, or indoor setting was used. In another example, the timestamping management application may analyze whether a flash was used.

In some embodiments, the timestamping management application may analyze a photograph to determine whether it was taken indoors or outdoors based on the signal strength of data networks (e.g., communications, wifi, GPS) when the photograph was taken. For example, the timestamping management application may analyze the GPS signal strength associated with a photograph to determine whether the photograph was taken indoors or outdoors. A weaker GPS signal strength, for example, may be indicative of an indoor environment while a stronger GPS signal strength may be indicative of an outdoor environment.

In some embodiments, the timestamping management application may analyze audio information associated with the photograph or sequence of photographs to determine whether it was taken indoors or outdoors. For example, the timestamping management application may process the audio to analyze the spectrum, to determine echo information, to determine reverberation information, to perform any other suitable function, or any combination thereof. A higher amount of echo, reverberation, or both, for example, may be indicative of an indoor environment while a lower amount of echo, reverberation, or both or a lack thereof may be indicative of an outdoor environment.

In some embodiments, the timestamping management application may determine that the photograph was taken at a particular portion of the day in response to determining that the photograph was taken outdoors. For example, the timestamping management application may determine that a photograph has a color temperature of 5500 K and may estimate, for example, that the photograph was taken outdoors during noon daylight lighting conditions. In another example, the timestamping management application may identify that the photograph was taken during daylight hours based on the color temperature of the digital photograph (e.g., 5500-6500 K), a strong GPS signal strength associated with the digital photograph, information that the flash was not used, information that a daytime or non-nighttime mode was used, any other suitable information, or any combination thereof.

In some embodiments, the timestamping management application may analyze a photograph to determine if it was taken outdoors during nighttime hours. For example, the timestamping management application may determine that a photograph has a color temperature of 4100 K and may estimate, for example, that the photograph was taken outdoors during nighttime lighting conditions (e.g., moonlight). The preceding determination may be made, for example, in correlation with a camera setting (e.g., a night setting, a flash, or both were used), lunisolar calendar information (e.g., moon phase), or both accessed in accordance with some embodiments of the present disclosure.

In some embodiments, the temporal information may correspond to a location, time zone, or both based on, for example, a user's electronic calendar or any other suitable calendar information. For example, the timestamping management application may analyze calendar information to identify the time the digital photograph was taken by determining a Coordinated Universal Time (UTC) offset when, for example, a user's electronic calendar indicates that the user was on vacation in a different time zone than the user's default time zone on or near the date the photograph was taken.

In some embodiments, the temporal information may correspond to a location, time zone, or both based on, for example, third party data, such as a user's location-based social network information. For example, the timestamping management application may analyze the timestamp associated with a photograph and location-related feeds from third party location-based social networks (e.g., Gowalla, Foursquare, Facebook Places, any other suitable social network, or any combination thereof) to identify the time the digital photograph was taken by determining a UTC offset when, for example, the user's location-based social network information indicates that the user posted an update that the user was located in a different city than the user's default location on or near the date the photograph was taken. GOWALLA is a service mark owned by Gowalla, Inc. FOURSQUARE is a service mark owned by Foursquare Labs, Inc. FACEBOOK is a service mark owned by Facebook, Inc.

In some embodiments, the temporal information may correspond to a location, time zone, or both based on, for example, GPS information. For example, the timestamping management application may analyze GPS information associated with a photograph to identify the time the digital photograph was taken by determining a Coordinated Universal Time (UTC) offset when, for example, the GPS information indicates that the photograph was taken in a different time zone than the user's default time zone on or near the date the photograph was taken.

In some embodiments, the temporal information may correspond to a clock displayed in a photograph. For example, the timestamping management application may analyze a photograph to identify the time the digital photograph was taken based on, for example, an analog clock (e.g., Big Ben, a street clock), digital clock (e.g., an electronic sign, an LED clock), any other suitable clock, or any combination thereof. In an example, the timestamping management application may perform image analysis to identify a clock in the photograph and a corresponding time that the photograph was taken (e.g., 3:30). In some embodiments, the timestamping management application may couple any suitable information, such as daylight information, with photographic clock information to determine the temporal information (e.g., 3:30 am, 3:30 pm).

In some embodiments, the temporal information may correspond to one or more related photographs. For example, some photographs in a photographic set may have been taken using a digital camera with GPS capabilities while other photographs in the photographic set may be taken using a digital camera without GPS capabilities. Since the timestamping management application may calculate a time offset to the initial timestamp of a photograph taken using the digital camera with GPS capabilities, the timestamping management application may apply the same time offset to the initial timestamp of a photograph taken using the digital camera without GPS capabilities if the timestamping management application has determined that the pictures were taken during the same event.

In some embodiments, the timestamping management application may determine if the initial time associated with a photograph corresponds to the temporal information indicative of when the photograph was taken. In some embodiments, the timestamping management application may analyze a photograph to determine if it was taken at a particular portion of the day and compare this determination to the initial timestamp. For example, the particular portion of the day indicated by the initial time may not match the particular portion of the day indicated by the temporal information. In another example, the date indicated by the initial time may be indicative of a default date setting (e.g., 2001-01-01) and may not correspond to the current date as indicated by a user's computer, a data network, any other suitable source, or any combination thereof. In another example, the date indicated by the initial time may predate the earliest date of manufacture for the specific camera model.

In some embodiments, the timestamping management application may analyze the time zone associated with a photograph to determine if it is consistent with the location associated with the photograph. The time zone may be based on a Coordinated Universal Time (UTC) offset (e.g., "UTC-08") or a Greenwich Mean Time (GMT) offset (e.g., "GMT+08") and may hereinafter be referred to as GMT offset. For example, the timestamping management application may analyze the Exif data for a photograph to check if the GMT offset matches the location. If the GMT offset does not match the location of the photograph, the timestamping management application may, for example, revise the GMT offset in the Exif data with the GMT offset calculated from the location.

In some embodiments, the timestamping management application may analyze a set of photographs to determine if the time associated with each photograph is consistent with the set. For example, the timestamping management application may order photographs by file name and compare each file to determine if the files are chronological (i.e., a non-forward progression of time may be indicative of one or more photographs having incorrect initial times).

In some embodiments, the timestamping management application may generate a revised time to associate with the digital photograph. For example, the timestamping management application may generate a revised time based on the temporal information and the determination that the time associated with a photograph does not correspond to the temporal information. The revised time may be, for example, a time offset to the initial timestamp, a specific time, or a temporal estimate.

In some embodiments, the timestamping management application may associate a revised time with a digital photograph in response to the initial time not corresponding to the identified temporal information. For example, the timestamping management application may monitor a calendar application for travel events to different time zones and adjust the timestamp of photographs taken during a travel event based on the location of the travel event. In another example, the timestamping management application may adjust the time associated with a photograph based on the revised time when a sum of weighted variables associated with the temporal information is above a threshold value. In some embodiments, the timestamping management application may associate a revised time with a digital photograph automatically (e.g., autocorrect functionality).

In some embodiments, the timestamping management application may associate a revised time with a related digital photograph that may be part of the same set of photographs. For example, the timestamping management application may associate a UTC offset to the initial time of a set of photographs taken using different user camera devices (e.g., digital camera, camera phone, portable gamine device, tablet computer, any other suitable device, or any combination thereof).

In some embodiments, the timestamping management application may require confirmation in order to associate a revised time with a digital photograph. For example, the timestamping management application may prompt a user to confirm the revised time, to input a user-specified time, or both in response to the initial time not corresponding to the identified temporal information.

In some embodiments, the timestamping management application may store the photograph and the revised time in an electronic storage device in accordance with some embodiments of the present disclosure. In another example, the timestamping management application may adjust the time associated with the digital photograph based on the revised time and store the adjusted digital photograph in an electronic storage device in accordance with some embodiments of the present disclosure.

Illustrative features of the present disclosure are described with reference to FIGS. 1-7 below.

FIG. 1 is a block diagram of an illustrative timestamping management system 100 for providing timestamping management in accordance with some embodiments of the present disclosure. System 100 is one example of a suitable architecture used in connection with implementing a timestamping management application having timestamping management capabilities. In some embodiments, other architectures may be used and may include more or fewer components than those illustrated.

System 100 may include user equipment 140, which may include, for example, one or more of the following components: processing equipment 102, output device 104, input device 106, network interface 108, modules 112, input/output (I/O) interface 150, any other suitable component, or any combination thereof. In some embodiments, user equipment may be referred to as a user device or user devices. In some embodiments, network interface 108, I/O interface 150, any other suitable interface, or any combination thereof may be referred to as a communications interface or communications interfaces.

In some embodiments, components 102, 104, 106, 108, 112, 150, any other suitable component, or any combination thereof may be part of a single installation or device, including but not limited to: a personal computer, a laptop, a tablet computer, an in-vehicle computer, a gaming computer, a personal computer television (PC/TV), a PC media server, a PC media center, a game console or device, an email device, a personal digital assistant, a smartphone, a mobile telephone, an internet phone, a satellite phone, a portable video player, a portable music player, a portable gaming machine, a wifi enabled laptop, netbook, or tablet computer, a 3G (or other cellular network) enabled laptop, netbook, or tablet computer, any other suitable device, or any combination thereof. For example, user equipment 140 may be a tablet computer running on the Internet.

In some embodiments, components 102, 104, 106, 108, 112, 150, any other suitable component, or any combination thereof may be implemented as separate devices. For example, components 104 and 106 may be included in a smartphone while components 102, 108, 112, and 150 are included in a PC/TV.

In some embodiments, components 102, 104, 106, 108, 112, 150, any other suitable component, or any combination thereof may exchange communications and data over communications path 110, which may be any suitable wired, wireless, or both path and which may use any suitable hardware, software, or both for facilitating the transfer of data and control signals between components. Communications path 110 may include one or more communications paths, such as a satellite path, a fiber-optic path, a cable path, a path that supports Internet communications, free-space connections (e.g., for broadcast or other wireless signals), one or more busses, any other suitable wired or wireless communications path, or any combination of such paths.

In some embodiments, the components shown in system 100 may be coupled with each other via communications paths, such as those described above in connection with paths 110, as well other short-range point-to-point communications paths, such as USB cables, IEEE 1394 cables, SVGA (Super Video Graphics Array) cables, wireless paths (e.g., Bluetooth, infrared, IEEE 802-11x, any other suitable wireless path, or any combination thereof), or other short-range communication via wired or wireless paths. BLUETOOTH is a certification mark owned by Bluetooth SIG, INC. The system components may also be coupled with each other through one or more indirect paths via data network 126. Communications path 110 may be provided by one or more of these communications paths, but is shown as a single path in FIG. 1 to avoid overcomplicating the drawing.

Processing equipment 102 may include any suitable software, hardware, or both for processing data. For example, processing equipment 102 may include any suitable processing circuitry such as one or more microprocessors (e.g., dual-core Intel® Xeon® Processors), microcontrollers, digital signal processors, programmable logic devices, any other suitable device, or any combination thereof. INTEL and XEON are registered trademarks owned by Intel Corporation.

In some embodiments, processing equipment 102 may include circuitry suitable for communicating with data network 126, third party server 130, or other networks or servers. In some embodiments, communications circuitry may be represented as network interface 108 and may be coupled to data network 126 through communications path 128. This circuitry may include, for example, a cable modem, an integrated services digital network (ISDN) modem, a digital subscriber line (DSL) modem, a telephone modem, a wireless modem, any other suitable communications device, or any combination thereof.

Communications path 128 may include one or more communications paths, such as a satellite path, a fiber-optic path, a cable path, a path that supports Internet communications, a path that supports free-space connections (e.g., for broadcast or other wireless signals, IEEE 802-11x, any other suitable path, or any combination thereof), one or more busses, any other suitable wired or wireless communications path, or any combination of such paths. Communications path 128 may be provided by one or more of these communications paths, but is shown as a single path in FIG. 1 to avoid overcomplicating the drawing.

Data network 126 may be one or more networks including the Internet, a mobile phone network, mobile device (e.g., Blackberry) network, cable network, public switched telephone network, wifi network, satellite network, local area network (LAN), wireless local area network (WLAN), or other types of communications network or combinations of communications networks. BLACKBERRY is a service mark owned by Research In Motion Limited Corp.

To provide for interaction with a user, user equipment 140 may include input device 106, output device 104, any other suitable device, or any combination thereof. In some embodiments, input device 106, output device 104, or both may be provided as stand-alone devices or integrated with other elements of user equipment 140.

In some embodiments, input device 106 may include hardware, software, or both. For example, input device 106 may include any suitable device or interface, such as a remote control, mouse, trackball, keypad, keyboard, touch screen, touch pad, stylus input, joystick, voice recognition interface, any other suitable input device or interface, or any combination thereof. For example, input device 106 may include a computer keyboard and mouse.

In some embodiments, input device 106 may be used to provide input data to processing equipment 102, any other suitable component, or any combination thereof. Input device 106 may provide access to or the ability to adjust the timestamp associated with a digital photograph by, for example, selecting a selectable option provided in a display screen. For example, the timestamp associated with a digital photograph may be adjusted by, for example, pressing a dedicated button (e.g., a key on a keyboard, a mouse button, a soft key, any other suitable button, or any combination thereof).

In some embodiments, input device 106 may provide access to or the ability to adjust the timestamp associated with a digital photograph by, for example, making a selection, inputting data, or both using a touchscreen, voice command, motion gesture (e.g., shaking, moving, making a gesture, any other suitable action, or any combination thereof), any other suitable option, or any combination thereof. For example, the timestamp associated with a digital photograph may be adjusted in response to a user touching a virtual display region on a touchscreen.

In some embodiments, illustrative timestamping management system 100 may provide the ability to adjust the timestamp associated with a digital photograph automatically. For example, the timestamp associated with a digital photograph may be adjusted in the absence of user action.

Output device 104 may include hardware, software, or both. Output device 104 may include one or more of a monitor, a television, a liquid crystal display (LCD) for a mobile device, a cathode ray tube (CRT) device, any other suitable equipment for providing visual images, or any combination thereof. For example, output device 104 may be a smartphone.

In some embodiments, one or more audio speakers may be provided as integrated with other elements of user equipment 140, such as output device 104, or may be stand-alone units. For example, output device 104 may be a computer monitor with integrated speakers.

Modules 112 may include any suitable software, hardware, or both. For example, modules 112 may include one or more types of storage devices, such as memory (e.g., random-access memory, read-only memory, synchronous dynamic random access memory, EPROM, EEPROM, flash memory devices, any other suitable memory, or any combination thereof), hard disks, magneto-optical disks, optical disks, any other suitable fixed or removable storage devices, or any combination thereof. In some embodiments, modules 112 may refer to any medium that participates in providing instructions to processing equipment 102 for execution. In some embodiments, the processing equipment and the memory may be supplemented by, or incorporated in, one or more application-specific integrated circuits (ASICs).

Modules 112 may include, for example, operating system 114 (e.g., Mac OS®, any other suitable operating system, or any combination thereof), network communications module 116, web browser application 118 (e.g., Apple Safari®), photo application 120 (e.g., Apple iPhoto®), calendar application 122 (e.g., Apple iCal®), any other suitable applications 124, or any combination thereof.

Operating system 114 may be multi-user, multi-processing, multi-tasking, multi-threading, real-time, any other suitable configuration or implementation, or any combination thereof and may perform tasks, including but not limited to: recognizing input from and providing output to components 102, 104, 106, 108, 150, any other suitable component, or any combination thereof; managing files, directories, or both on modules 112, any other suitable memory or storage, or any combination thereof; controlling peripheral devices (e.g., peripheral device 152), any other suitable device, or any combination thereof; and managing communications path 110, any other suitable communications paths, or any combination thereof.

Network communications module 116 may include software, hardware, or both for establishing and maintaining network connections (e.g., software for implementing communication protocols, such as TCP/IP, HTTP, any other suitable software or hardware, or any combination thereof).

Web browser application 118 may include hardware, software, or both to implement a web browser window, web browser navigation controls, timestamping controls, calendar controls, social networking controls, or any other suitable functionality.

Photo application 120 may include hardware, software, or both for receiving, modifying, storing, and otherwise managing digital photographs.

Calendar application 122 may include hardware, software, or both for generating, receiving, modifying, storing, and otherwise managing calendar events.

Other applications 124 may include hardware, software, or both for providing any suitable function or functions in accordance with some embodiments of the present disclosure.

In some embodiments, information associated with digital photographs may be stored in modules 112 for use in identifying timestamps, providing revised timestamps, providing any other suitable information, or any combination thereof.

In some embodiments, user equipment 140 may include circuitry suitable for communicating with a peripheral device. In some embodiments, communications circuitry may be represented as I/O interface 150 and may be coupled to a peripheral device (e.g., peripheral device 152) through communications path 154. This circuitry may include, for example, a USB interface, an IEEE 1394 interface, an SVGA interface, a modem, a wireless interface, any other suitable circuitry or interface, or any combination thereof.

Peripheral device 152 may include any capable hardware, software, or both. In some embodiments, peripheral device 152 may be referred to as user camera equipment, a user camera device, a peripheral device, or user camera devices. In some embodiments, peripheral device 152 may function as a standalone device or may be part of a network of devices. For example, peripheral device 152 may include one or more of the following devices: a digital camera, an analog camera, a video camera, a web camera, a PC, a laptop, a tablet computer, a scanner, a gaming device, a portable music player, a personal computer television (PC/TV), a PC media server, a PC media center, a PDA, a smartphone, a mobile telephone, an internet phone, a satellite phone, any other suitable device, or any combination thereof. In an example, peripheral device 152 may be a digital single-lens reflex camera (SLR) camera.

Communications path 154 may include any of the communications paths described above in connection with path 110 and 128 and may be exchanged over one or more communications paths, but is shown as a single path in FIG. 1 to avoid overcomplicating the drawing. In some embodiments, component 152 may communicate with user equipment 140, third party server 130, any other suitable component, or any combination thereof via one or more indirect paths through data network 126.

Third party server 130 may include any capable hardware, software, or both. In some embodiments, third party server 130 may include one or more computers and may be coupled to data network 126 through communications path 132. In some embodiments, system 100 may include third party database 134, which may include hardware, software, or both. For example, third party database 134 may include memory, storage, or both as described with reference to modules 112. Third party server 130 may be coupled to third party database 134 through communications path 136. In some embodiments, third party database 134 may include one or more separable databases coupled to third party server 130, each other, or both through any suitable communications path in accordance with some embodiments of the present disclosure.

In some embodiments, photo application 120, calendar application 122, or both may be partially or wholly implemented using server 130, database 134, any other suitable server or database, or any combination thereof. For example, photo application 120, calendar application 122, or both may be online applications hosted by one or more servers 130 and databases 134 and accessed using, for example, web browser application 118 and network interface 108.

Communications paths 132 and 136 may include any of the communications paths described above in connection with path 110 and 128 and may be exchanged over one or more communications paths, but are shown as single paths in FIG. 1 to avoid overcomplicating the drawing. Although communications between components 130 and 134 with user equipment 140 are shown as through data network 126, in some embodiments, components 130 and 134 may communicate directly with user equipment 140 via communications paths such as those described above in connection with paths 110 and 128.

The timestamping management application may be either partially or wholly implemented on any suitable component or combination or components described with connection to system 100. In some embodiments, the timestamping management application may be implemented in a computer system that may include a back-end component (e.g., a data server, any other suitable back-end component, or any combination thereof), a middleware component (e.g., an application server, an Internet server, any other suitable middleware component, or any combination thereof), a front-end component (e.g., a client computer having a graphical user interface or an Internet browser, any other suitable front-end component, or any combination thereof), any other suitable component, or any combination thereof. The components of system 100 may be part of a single installation or device capable of implementing the timestamping management application and may be connected by any form or medium of communication, such as those described above in connection with paths 110, 128, and 154 and data network 126.

In some embodiments, processing equipment 102 may execute instructions for the timestamping management application. The timestamping management application may be, for example, integrated into photo application 120, calendar application 122, operating system 114, any other suitable application, or any combination thereof. For example, the timestamping management application may include or function with photo application 120, any other suitable component, or any combination thereof. In some embodiments, the timestamping management application may be a photo application plug-in.

In some embodiments, a peripheral device 152 may be used to provide a digital photograph to the timestamping management application. For example, the timestamping management application may receive a digital photograph and associated temporal information (e.g., time the photograph was taken) via peripheral device 152.

In some embodiments, the timestamping management application may identify the time the digital photograph was taken. In some embodiments, the timestamping management application may access calendar application 122 or third party database 134 (e.g., a database of location-based social network information) in response to receiving a digital photograph via peripheral device 152 in order to identify the time zone in which the photograph was taken. For example, the timestamping management application may identify the time the digital photograph was taken using a Coordinated Universal Time (UTC) offset when calendar application 122, third party database 134, or both state that the camera user was on vacation in a different time zone than the camera user's default time zone on or near the date the digital photograph was taken.

In some embodiments, the timestamping management application may identify the time in which the photograph was taken based on the color temperature of the photograph, camera settings, GPS signal strength, any other suitable attribute, or any combination thereof. For example, the timestamping management application may use processing equipment 102 to identify that the digital photograph was taken during daylight hours based on the color temperature of the digital photograph, a strong GPS signal strength associated with the digital photograph, information that the flash was not used, information that a daytime or non-nighttime mode was used, any other suitable information, or any combination thereof.

In some embodiments, the timestamping management application may determine that the time associated with a photograph does not correspond to the time the photograph was taken. For example, the timestamping management application may use processing equipment 102 to determine that the time the digital photograph was taken does not correspond to the identified time.

In some embodiments, the timestamping management application may generate a revised time to associate with the digital photograph. For example, the timestamping management application may use processing equipment 102 to generate a revised time to associate with the digital photograph when the time the digital photograph was taken does not correspond to the identified time.

In some embodiments, the timestamping management application may associate the revised time with the digital photograph. For example, the timestamping management application may store the digital photograph and the revised time in modules 112, any other suitable electronic storage, or any combination thereof. In another example, the timestamping management application may use processing equipment 102 to adjust the time associated with the digital photograph based on the revised time and store the adjusted digital photograph in modules 112, any other suitable electronic storage, or any combination thereof.

Figure 2:
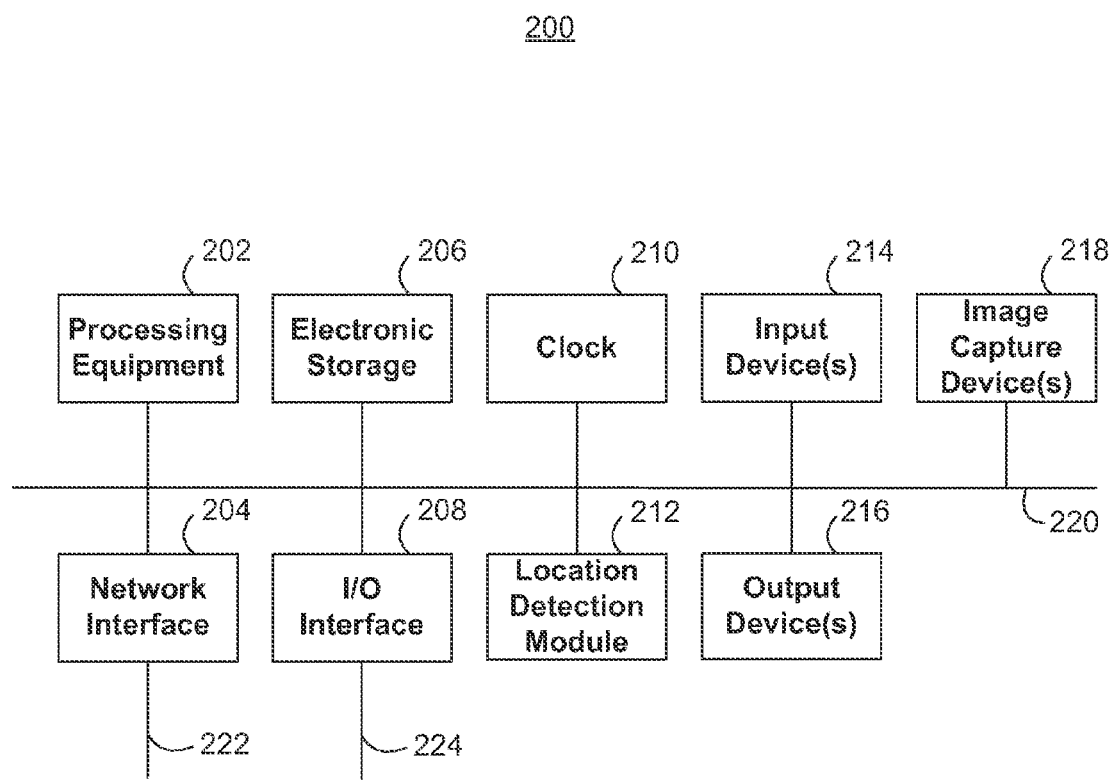
FIG. 2 is a block diagram of an illustrative user camera device in accordance with some embodiments.

FIG. 2 is a block diagram of an illustrative user camera device 200 in accordance with some embodiments of the present disclosure. In some embodiments, user camera device 200 may be referred to as user camera equipment, a user camera device, user camera devices, a peripheral device, or an equipment device. User camera device 200 is one example of a suitable architecture used in connection with partially or wholly implementing a timestamping management application having image capture and management capabilities. In some embodiments, other architectures may be used and may include more or fewer components than those illustrated.

User camera device 200 may include hardware, software, or both. In some embodiments, user camera device 200 may include one or more of the following components: processing equipment 202, network interface 204, electronic storage 206, I/O interface 208, clock 210, location detection module 212, input device 214, output device 216, image capture device 218, any other suitable component, or any combination thereof. In some embodiments, network interface 204, I/O interface 208, any other suitable interface, or any combination thereof may be referred to as a communications interface or communications interfaces.

In some embodiments, components 202, 204, 206, 208, 210, 212, 214, 216, 218, any other suitable component, or any combination thereof may be part of a single installation or device, including but not limited to: a digital camera, an analog camera, a video camera, a web camera, a PC, a laptop, a tablet computer, a scanner, a gaming device, a portable music player, a personal computer television (PC/TV), a PC media server, a PC media center, a PDA, a smartphone, a mobile telephone, an internet phone, a satellite phone, any other suitable device, or any combination thereof. For example, user camera device 200 may be a digital camera connected to a wifi network.

In some embodiments, components 202, 204, 206, 208, 210, 212, 214, 216, 218, any other suitable component, or any combination thereof may be implemented as separate devices. For example, components 212, 214, 216, and 218 may be included in a smartphone while components 202, 204, 206, 208, and 210 may be included in a computing device.

In some embodiments, components 202, 204, 206, 208, 210, 212, 214, 216, 218, any other suitable component, or any combination thereof may exchange communications and data over communications path 220, which may be any suitable wired, wireless, or both path and which may use any suitable hardware, software, or both for facilitating the transfer of data and control signals between components. Communications path 220 may include any suitable communications paths, such as those described with reference to communications paths 110 and 128. Communications path 220 may be provided by one or more of these communications paths but are shown as a single path in FIG. 2 to avoid overcomplicating the drawing.

Processing equipment 202 may include any suitable software, hardware, or both for processing data. For example, processing equipment 202 may include any suitable processing circuitry such as one or more microprocessors, microcontrollers, digital signal processors, programmable logic devices, any other suitable device, or any combination thereof. In some embodiments, processing equipment 202 may execute instructions for an application stored in electronic storage 206, any other suitable storage, or any combination thereof. For example, processing equipment 202 may combine image data with timestamp data, location data, and camera settings data to generate a digital photograph. In another example, processing equipment 202 may analyze an image to determine color temperature information, photographic clock information, any other suitable information, or any combination thereof.

In some embodiments, processing equipment 202 may include circuitry suitable for communicating with data network 126, user equipment 140, third party server 130, or other networks or servers. In some embodiments, communications circuitry may be represented as network interface 204 and may be coupled to other components, networks, or both through communications path 222. Communications circuitry may include, for example, a cable modem, an integrated services digital network (ISDN) modem, a digital subscriber line (DSL) modem, a telephone modem, a wireless modem, any other suitable communications device, or any combination thereof for communications with other equipment. In some embodiments, communications circuitry may include circuitry that enables peer-to-peer communication of equipment devices, communication of equipment devices in locations remote from each other, or both.

In some embodiments, network interface 204 may provide information regarding network connectivity to processing equipment 202, electronic storage 206, clock 210, any other suitable component, or any combination thereof. For example, network interface 204 may provide a "wifi enabled" signal to, for example, processor 202. In another example, network interface 204 may provide the type and strength of any connected communications network to, for example, electronic storage 206 when a photograph is taken using image capture device 218.

Communications path 222 may include one or more communications paths, such as paths described with reference to communications paths 110 and 128. Communications path 222 may be provided by one or more of these communications paths, but is shown as a single path in FIG. 2 to avoid overcomplicating the drawing.

In some embodiments, processing equipment 202 may include circuitry suitable for communicating with data network 126, user equipment 140, third party server 130, or other networks or servers as a peripheral device. In some embodiments, peripheral communications circuitry may be represented as I/O interface 208 and may be coupled to other components, networks, or both through communications path 224. Communications circuitry may include, for example, a USB interface, an IEEE 1394 interface, an SVGA interface, a modem, a wireless interface, any other suitable circuitry or interface, or any combination thereof. In some embodiments, communications circuitry may include circuitry that enables peer-to-peer communication of equipment devices, communication of equipment devices in locations remote from each other, or both. In some embodiments, I/O interface 208 may be partially or wholly implemented as network interface 204. For example, network interface 204 may include a cable modem and a USB interface.

Communications path 224 may include one or more communications paths, such as paths described with reference to communications paths 110 and 128. In some embodiments, communications path 224 may be either partially or wholly implemented as communications path 154 shown in FIG. 1. Communications path 224 may be provided by one or more of these communications paths, but is shown as a single path in FIG. 2 to avoid overcomplicating the drawing.

In some embodiments, user camera device 200 may include electronic storage 206. Electronic storage 206 may include any capable hardware, software, or both for storing data. For example, electronic storage 206 may include memory (e.g., random-access memory, read-only memory, any other suitable memory, or any combination thereof), hard drives, optical drives, nonvolatile memory, photographic film, magnetic tape, any other suitable fixed or removable storage devices, or any combination thereof. In some embodiments, electronic storage 206 may include one or more of the above types of storage devices. For example, user camera device 200 may include an internal hard drive and a nonvolatile memory card.

Electronic storage 206 may be used to store various types of information described herein with reference to the time-stamping management, such as: application data; image processing data; image data; time data; location and GPS data; camera settings; Exif data; user preferences; any other suitable data; or any combination thereof.

In some embodiments, user camera device 200 may include clock 210. Clock 210 may include any capable hardware, software, or both for indicating and synchronizing time. For example, clock 210 may regulate time using an electronic oscillator, such as a quartz crystal. In some embodiments, user camera device 200 may capture the clock time when a picture is taken. For example, image data and the time associated with clock 210 may be stored in electronic storage 206 as a digital photograph and an associated timestamp when a camera user takes a picture using user camera device 200.

In some embodiments, user camera device 200 may include location detection module 212. Location detection module 212 may include any capable hardware, software, or both for determining the geographic location of user camera device 200. For example, location detection module 212 may include a satellite positioning system (e.g., GPS), antenna triangulation system, wifi capability, any other suitable hardware, software, or both, or any combination thereof. Location detection module 212 may be used, for example, to provide geographic location information to user equipment 140 via communications path 224.

For purposes of clarity, and not by way of limitation, the location determining features of the present disclosure with respect to equipment devices will be referred to herein as a location detection module (e.g. location detection module 212), a location detection computing device, or a location detection adapter. It will be understood that this term refers not only to global positioning satellite systems but also to other types of positioning systems, such as regional satellite systems, antenna triangulation, location tracking via Internet protocol (IP) address, any other suitable location determining mechanism, or any combination thereof.

To provide for interaction with a camera user, user camera device 200 may include input device 214, output device 216, any other suitable device, or any combination thereof. In some embodiments, input device 214, output device 216, or both may be provided as stand-alone devices or integrated with other elements of user camera device 200.

Input device 214 may include hardware, software, or both. In some embodiments, input device 214 may include any suitable device or interface, such as a button, selection wheel, remote control, trackball, keypad, touch screen, touch pad, stylus input, joystick, microphone, voice recognition interface, any other suitable input device or interface, or any combination thereof. For example, input device 214 may include a camera shutter button for taking pictures, a camera settings selector, and an LCD touchscreen display for manipulating image data.

In some embodiments, input device 214 may provide access to or the ability to capture image data in response to, for example, a camera user pressing a dedicated button (e.g., a virtual region on a touchscreen, a soft key, any other suitable button, or any combination thereof). For example, image data may be captured by image capture device 218 and stored in electronic storage 206 in response to a camera user pressing a camera shutter button.

In some embodiments, input device 214 may provide access to or the ability to adjust the time associated with clock 210, image data stored in electronic storage 206, or both in response to, for example, a camera user pressing a dedicated button (e.g., a virtual region on a touchscreen, a soft key, any other suitable button, or any combination thereof) or providing an audible command (e.g., a voice command). For example, the time associated with clock 210 may be adjusted in response to a camera user manually entering the time and pressing a confirmation button (e.g., "OK", "enter") on the exterior of a camera. In another example, the time associated with clock 210 may be adjusted in response to a camera user saying "the time is now 1:23 pm", "time zone: Pacific Daylight", "location: Cupertino, Calif." into a microphone, voice recognition interface, or both.

Output device 216 may include hardware, software, or both. In some embodiments, output device 216 may include one or more of a monitor, a touchscreen display, any other suitable equipment for providing visual images. For example, output device 216 may be an LCD touchscreen display.

Image capture device 218 may include hardware, software, or both. Image capture device 218 may include one or more of an optical lens, an image sensor (e.g., a charge-coupled device (CCD) sensor, a complementary metal-oxide-semiconductor (CMOS) sensor, any other suitable sensor, or any combination thereof), or both. For example, image capture device 218 may be an optical lens coupled to a three-CCD sensor. Illustrative features of image capture device 218 are described with reference to FIG. 3 below.

Figure 3:
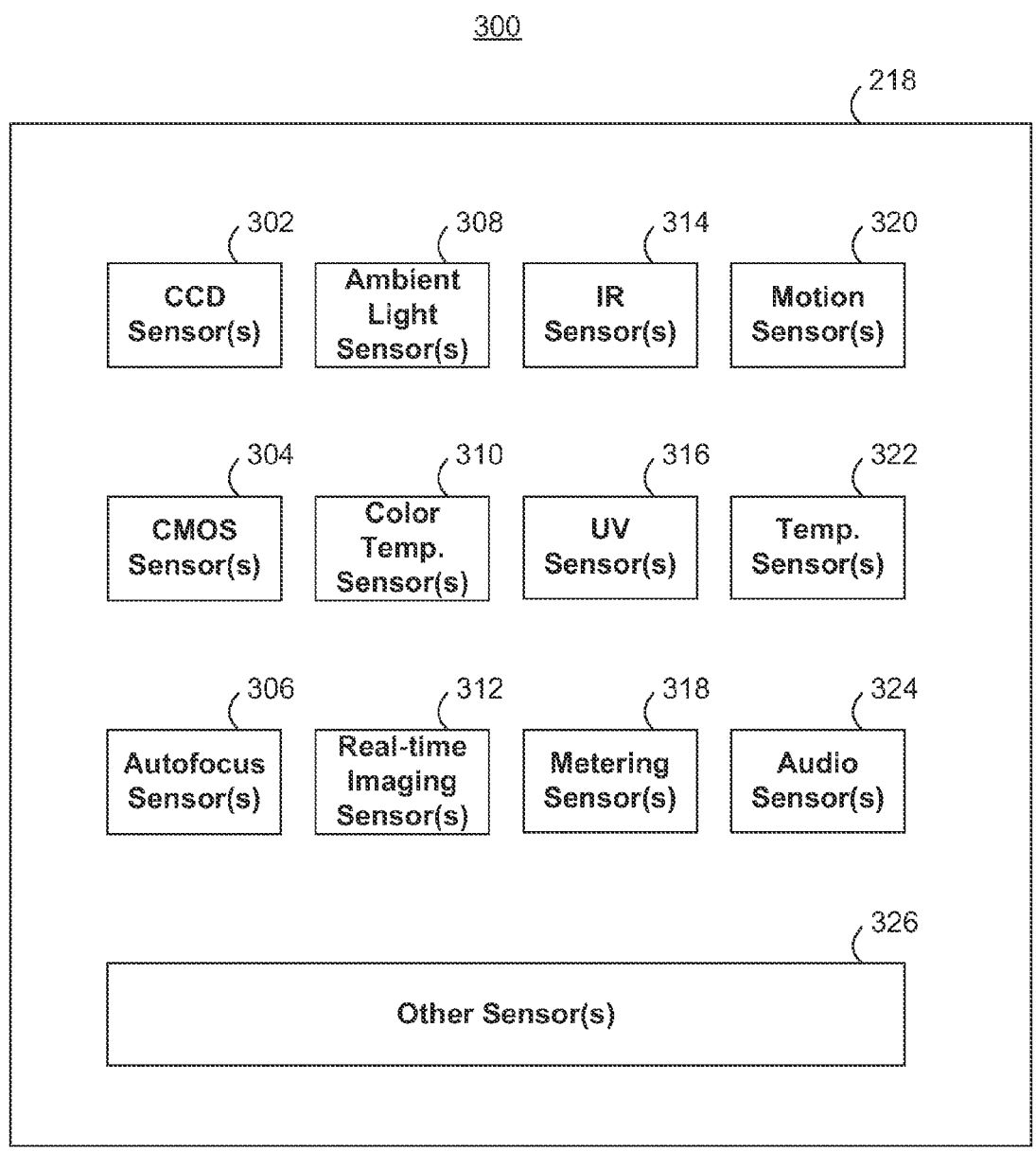
FIG. 3 is a block diagram of an illustrative image capture device in accordance with some embodiments.

FIG. 3 is a block diagram of an illustrative image capture device 218 in accordance with some embodiments of the present disclosure. Image capture device 218 is one example of a suitable architecture used in connection with partially or wholly implementing a timestamping management application having image capture and management capabilities. In some embodiments, other architectures may be used and may include more or fewer components than those illustrated.

Image capture device 218 may include hardware, software, or both. Image capture device 218 may include, for example, one or more of the following components: CCD sensor 302, CMOS sensor 304, autofocus sensor 306, ambient light sensor 308, color temperature sensor 310, real-time imaging sensor 312, infrared (IR) sensor 314, ultraviolet sensor 316, metering sensor 318, motion sensor 320, temperature sensor 322, audio sensor 324, any other suitable sensor 326, or any combination thereof.

CCD sensor 302 may include hardware, software, or both. In some embodiments, CCD sensor 302 may include image sensing and image processing functionality for light detection, capturing visual images, or both using one or more photoactive regions, transmission regions, image processing equipment, any other suitable equipment, or any combination thereof. For example, CCD sensor 302 may be silicon-based sensor integrated with a photoelectric image sensor and coupled to one or more optical lenses, mirrors, or both to provide digital image data. In another example, CCD sensor 302 may be a frame transfer CCD sensor or a three-CCD sensor coupled to one or more optical lenses, mirrors, or both.

CMOS sensor 304 may include hardware, software, or both. In some embodiments, CMOS sensor 304 may include image sensing and image processing functionality for light detection, capturing visual images, or both using an integrated circuit containing an array of active pixel sensors, photodetectors, amplifiers, any other suitable equipment, or any combination thereof. For example, CMOS sensor 304 may be a silicon-based CMOS chip fabricated using the CMOS semiconductor process and may implement circuitry and photo sensors to convert photonic information into digital data.

Autofocus sensor 306 may include hardware, software, or both. In some embodiments, autofocus sensor 306 may include one or more sensors, a control system, and a motor to determine correct focus on a spatial point or area. For example, autofocus sensor 306 may sense range, speed, and acceleration data using, for example, ultrasonic signals, infrared signals, or both and adjust image capture device 218 accordingly to maintain correct focus.

Ambient light sensor 308 may include hardware, software, or both. In some embodiments, ambient light sensor 308 may include one or more of the following components for sensing illuminance, spectral data, or both: optical detectors (e.g., photonic sensors), chemical detectors (e.g., silver halide photographic plates), photoresistors (e.g., light dependent resistors), photovoltaic cells (e.g., organic solar cells), photodiodes (e.g., photovoltaic or photoconductive photodiodes), phototubes (e.g., photomultiplier tubes that include photocathodes and amplifying dynodes), phototransistors, CCD sensors, CMOS sensors, reverse-biased light emitting diodes (LEDs), any other suitable component, or any combination thereof. For example, ambient light sensor 308 may be a photodiode-based ambient light sensor.

Color temperature sensor 310 may include hardware, software, or both. In some embodiments, color temperature sensor 310 may include image sensing and image processing functionality for determining the color temperature of image data, ambient light, or both. For example, color temperature sensor 310 may include processing equipment and one or more photodetectors to provide color temperatures quantified using, for example, the Kelvin scale. In some embodiments, color temperature sensor 310 may be implemented along with sensors 302, 304, 308, any other suitable sensor, or any combination thereof.

Real-time imaging sensor 312 may include hardware, software, or both. In some embodiments, real-time imaging sensor 312 may include image sensing and image processing functionality for capturing real-time image data, such as video data. For example, real-time imaging sensor 312 may include processing equipment and one or more CCD or CMOS-based imaging sensors and provide real-time images to, for example, electronic storage 206.

IR sensor 314 may include hardware, software, or both. In some embodiments, IR sensor 314 may include one or more of the following components for sensing infrared data: microbolometers, pyroelectric detectors, ferroelectric detectors, Golay-type detectors, marrow-gap semiconductor photodetectors (e.g., indium arsenide), quantum well infrared photodetectors, any other suitable component, or any combination thereof. For example, IR sensor 314 may be an uncooled focal plane arrays (UFPA) infrared imaging device.

UV sensor 316 may include hardware, software, or both. In some embodiments, UV sensor 316 may include one or more of the following components for sensing ultraviolet data: photodiodes, photocathodes, photomultipliers, any other suitable component, or any combination thereof. For example, UV sensor 316 may be an ultraviolet photomultiplier.

Metering sensor 318 may include hardware, software, or both. In some embodiments, metering sensor 318 may include one or more sensors and a control system to determine exposure information. For example, metering sensor 318 may sense light intensity, color data, aperture data, and shutter speed using, for example, a CCD image sensor coupled to processing equipment to determine an optimal exposure value.

Motion sensor 320 may include hardware, software, or both. In some embodiments, motion sensor 320 may include one or more optical detectors, acoustic detectors, infrared sensors, ultrasonic sensors, microwave sensors, and processing equipment to determine changes in a sensed environment. For example, motion sensor 320 may measure a change in speed or vector of an object using, for example, a passive infrared (PIR) sensor coupled to processing equipment.

Temperature sensor 322 may include hardware, software, or both. In some embodiments, temperature sensor 322 may include one or more thermometers, thermisters, infrared sensors, and processing equipment to determine temperature information. For example, temperature sensor 322 may measure temperature information using, for example, a resistive thermal device (RTD) coupled to processing equipment. coupled to processing equipment.

Audio sensor 324 may include hardware, software, or both. In some embodiments, audio sensor 324 may use electromagnetic induction, capacitance change, piezoelectric generation, light modulation, any other suitable method, or any combination thereof to determine audio information from sounds or mechanical vibrations. For example, audio sensor 324 may determine echo and reverberation data using, for example, a silicon MEMS (micro-electro-mechanical systems) microphone.

Figure 4:
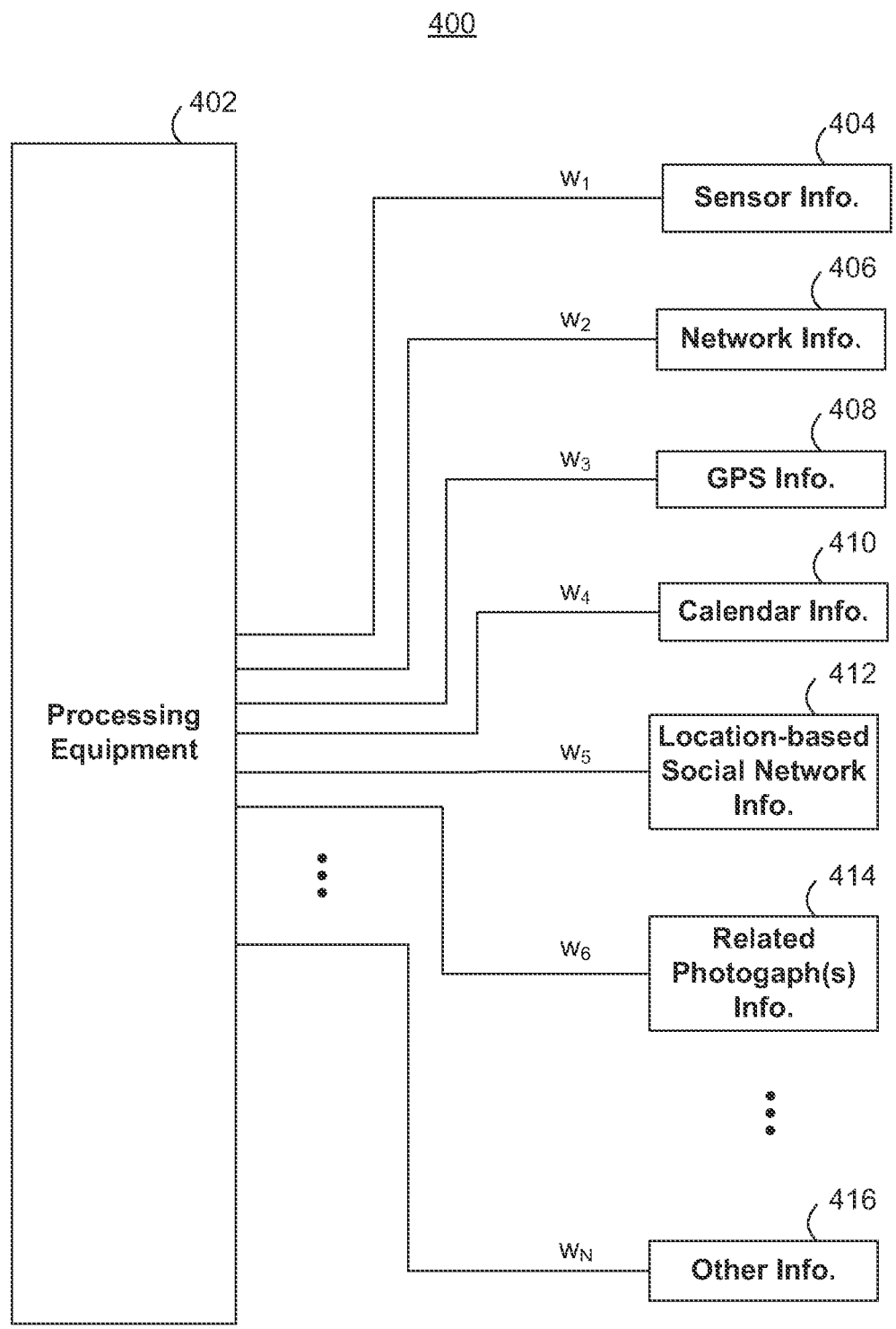
FIG. 4 shows a block diagram of illustrative processing equipment in accordance with some embodiments.

FIG. 4 is a block diagram of illustrative processing equipment 400 for identifying the time a photograph was taken in accordance with some embodiments of the present disclosure. Processing equipment 400 is one example of suitable Processing equipment used in connection with a timestamping management application having timestamping management capabilities. In some embodiments, other implementations of varying complexity may be used and may include more or fewer components than those illustrated.

The timestamping management application may implement processing equipment 400 to identify the time a photograph was taken using various information and weightings. In some embodiments, the timestamping management application may identify the time a photograph was taken using one or more of the following components: processing equipment 402, sensor information 404 with associated weight w1, network information 406 with associated weight w2, GPS information 408 with associated weight w3, calendar information 410 with associated weight w4, location-based social network information 412 with associated weight w5, related photograph information 414 with associated weight w6, any other suitable information 416 with associated weight wN, or any combination thereof.

Processing equipment 402 may be any suitable hardware, software, or both for receiving a photograph and associated timestamp information, identifying the time a photograph was taken, determining that a timestamp associated with a photograph does not correspond to the time the photograph was taken, generating a revised time, associating a revised time with a photograph, performing any other suitable function, or any combination thereof. In some embodiments, processing equipment 402 may include any suitable features for processing information, such as those described above in connection with processing equipment 102, 202, or both. In some embodiments, processing equipment 402 may be partially or wholly implemented as processing equipment 102, 202, or both. For example, processing equipment 402 may include processing equipment 202.

Sensor information 404 may be any suitable information for associating times, dates, or both with photographic information. Sensor information 404 may include, for example, optical information, CCD information, CMOS information, autofocus information, ambient light information, color temperature information, real-time imaging information, infrared (IR) information, ultraviolet information, metering information, motion information, temperature information, audio information, information associated with camera settings, information associated with image analyses, any other suitable information, or any combination thereof. In some embodiments, sensor information 404 may be provided by user camera equipment 152, image capture device 218, user equipment 140, any other suitable component, or any combination thereof via any suitable communications path.

Network information 406 may be any suitable information for associating times, dates, or both with the connectivity, availability, or both of communications networks. Network information may include, for example, information indicative of status, strength, and type of one or more communications networks (e.g., wifi enabled, signal strength low). In some embodiments, network information 406 may include information for communications networks connected to, for example, network interface 204. In some embodiments, network information 406 may include information for available communications networks sensed by, for example, network interface 204. In some embodiments, network information 406 may be provided by user camera equipment 152, network interface 204, any other suitable component, or any combination thereof via any suitable communications path.

GPS information 408 may be any suitable information for associating times, dates, or both with location information. Location information may include, for example, positioning information, latitude-longitude-height information, Military Grid Reference System (MGRS) information, Universal Transverse Mercator (UTM) information, postal code information, time zone information, any other suitable information, or any combination thereof. In some embodiments, GPS information 408 may include information indicative of signal strength. In some embodiments, GPS information 408 may be provided by user camera equipment 152, location detection module 212, any other suitable component, or any combination thereof via any suitable communications path.

Calendar information 410 may be any suitable information for associating times, dates, or both with event information. Event information may include, for example, appointment information, meeting information, address information, location information, contact information, name information, availability information, scheduling information, any other suitable information, or any combination thereof. In some embodiments, calendar information 410 may include information indicative of the cycle or phase of the sun or the moon. In some embodiments, calendar information 410 may be provided by calendar application 122, server 130, database 134, any other suitable component, or any combination thereof via any suitable communications path.

Location-based social network information 412 may be any suitable information for associating times, dates, or both with event information. For example, location-based social network information 412 may be one or more location-related feeds posted by a camera user in one or more third party location-based social networks. In some embodiments, location-based social network information 412 may be provided by web browser application 118, server 130, database 134, any other suitable component, or any combination thereof via any suitable communications path.

Related photograph information 414 may be any suitable information for associating times, dates, or both with a related photograph. For example, related photograph information 414 may include the time a related photograph was taken (e.g., the timestamp of a related photograph). In some embodiments, the related photograph may be associated in time with the received photograph and may have been taken using a different camera than the received photograph. In some embodiments, related photograph information 414 may be provided by user equipment 140, user camera equipment 152, server 130, database 134, any other suitable component, or any combination thereof via any suitable communications path.

Other information 416 may be any other suitable information for associating times, dates, or both with a related photograph. For example, other information 416 may include metadata, Exif data, clock data, camera settings, any other suitable information, or any combination thereof.

The timestamping management application may implement processing equipment 400 to determine that the time associated with a photograph does not correspond to the time the photograph was taken. For example, processing equipment 402 may determine that the time the digital photograph was taken does not correspond to the identified time by comparing a weighted sum or average of information 404, 406, 408, 410, 412, 414, 416, any other suitable information, or any combination thereof to a threshold value. In some embodiments, the threshold value may be determined adaptively by processing equipment 402. In some embodiments, the threshold value may be determined by a user. In some embodiments, processing equipment 400 may also include error data associated with the information, although error data is not shown in FIG. 4 to avoid over-complicating the drawing.

In some embodiments, the timestamping management application may implement processing equipment 400 to generate a revised time to associate with the digital photograph based on the identified time that the photograph was taken, the determination that the time associated with a photograph does not correspond to the time the photograph was taken, any other suitable information, or any combination thereof. For example, the timestamping management application may use processing equipment 102 to adjust the time associated with a photograph based on the revised time when the weighted sum of information is above a threshold value.

Figure 5:
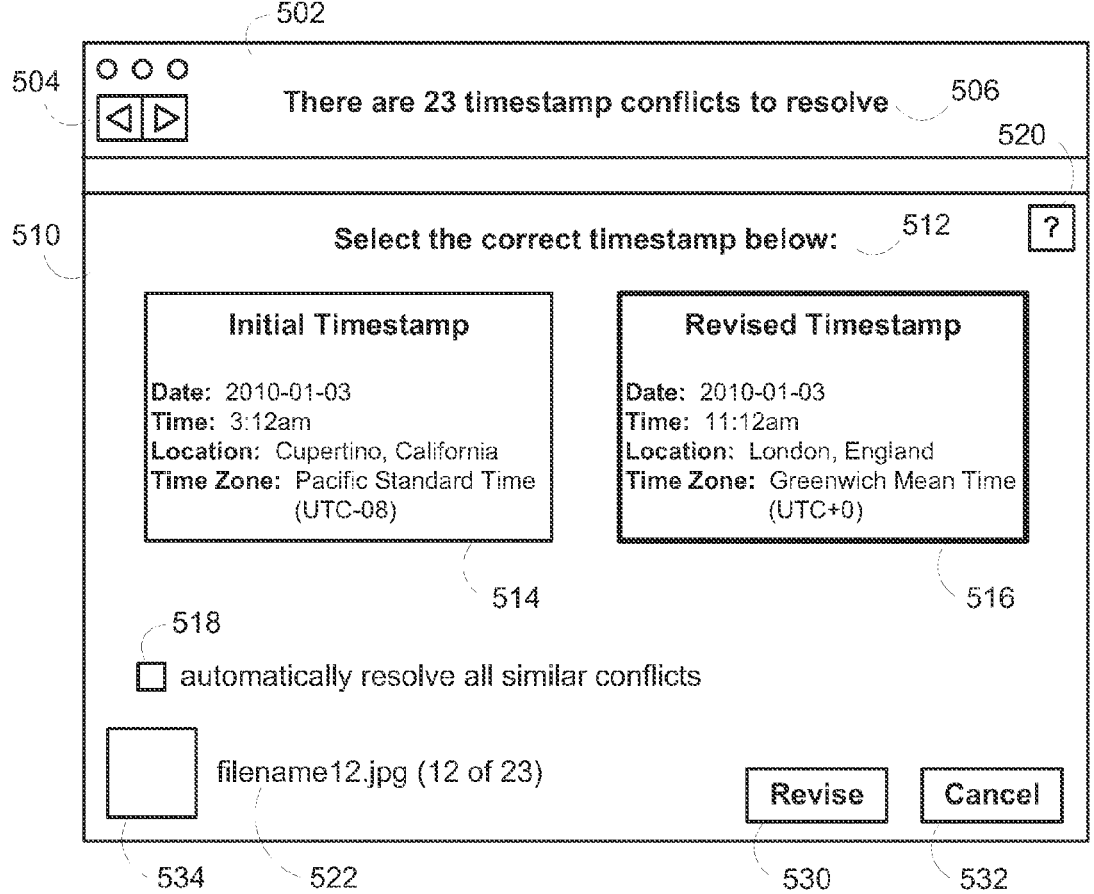
FIG. 5 shows an illustrative display screen for providing a confirmation prompt in accordance with some embodiments.

FIG. 5 shows an illustrative display screen 500 for providing a confirmation prompt in accordance with some embodiments of the present disclosure. In some embodiments, the timestamping management application may provide access to any suitable type of information in a single display, a single screen overlay, multiple displays, multiple screen overlays, any other suitable display, or any combination thereof and may or may not be updated at any suitable time interval.

In some embodiments, the timestamping management application may provide access to or the ability to prompt a user to confirm a revised time (e.g., a revised time generated in accordance with processing equipment 400). For example, the timestamping management application may provide display screen 500 in response to processing equipment 402 determining that a timestamp associated with a photograph does not correspond to the time the photograph was taken.

In some embodiments, display screen 500 may include navigation region 502 for displaying one or more individually selectable portions, such as navigational controls 504 (e.g., back icon, forward icon, close icon, minimize icon, maximize icon, any other suitable icon, or any combination thereof), any other suitable field, icon, or button, or any combination thereof. In some embodiments, navigation region 502 may include informational header 412 (e.g., "There are 23 timestamp conflicts to resolve").

In some embodiments, display screen 500 may include confirmation region 510. Confirmation region 510 may be, for example, a single display region, a single screen overlay region, multiple display regions, multiple screen overlay regions, any other suitable display, or any combination thereof. In some embodiments, confirmation region 510 may be accompanied by informational header 512 (e.g., "Select the correct timestamp below"), initial timestamp region 514, revised timestamp region 516, automatic revision checkbox 518 (e.g., "automatically resolve all similar conflicts"), selectable icon 520 (e.g., "?"), informational display region 534, informational dialog 522 (e.g., "filename12.jpg (12 of 23)"), affirmative confirmation option 530 (e.g., "Revise"), negative confirmation option 532 (e.g., "Cancel"), any other suitable feature or option, or any combination thereof.

In some embodiments, the timestamping management application may receive a photograph and data representing an initial time associated with the photograph, such as a timestamp, through any suitable communications path, network, or both in accordance with some embodiments of the present disclosure. The timestamping management application may display information associated with the initial time in, for example, initial timestamp region 514.

Initial timestamp region 514 may include, for example, an informational header (e.g., "Initial Timestamp") and temporal information associated with a received photograph, such as the date (e.g., "Date: 2010-01-03"), time (e.g., "Time: 3:12 am"), location (e.g., "Location: Cupertino, Calif."), time zone (e.g., "Time Zone: Pacific Standard Time (UTC-08)"), any other suitable information, or any combination thereof. In some embodiments, initial timestamp region 514 may be individually selectable.

In some embodiments, the timestamping management application may identify the time a photograph was taken and generate a revised time when the initial time associated with the photograph does not correspond to the time the photograph was taken using any suitable components, communications paths, networks, or a combination thereof in accordance with some embodiments of the present disclosure. The timestamping management application may display information associated with the revised time in, for example, revised timestamp region 516.

Revised timestamp region 516 may include, for example, an informational header (e.g., "Revised Timestamp") and temporal information associated with an identified time, revised time, or both, such as the date (e.g., "Date: 2010-01-03"), time (e.g., "Time: 11:12 am"), location (e.g., "Location: London, England"), time zone (e.g., "Time Zone: Greenwich Mean Time (UTC+0)"), any other suitable information, or any combination thereof. In some embodiments, revised timestamp region 516 may be individually selectable. For example, revised timestamp region 516 is illustrated as being highlighted in response to a user selecting revised timestamp region 516 using an input device.

In some embodiments, revised timestamp region 516 may include information indicative of a revised time generated in accordance with, for example, processing equipment 400. In an example, the timestamping management application may generate a revised time based on the color temperature of a photograph, user location information, any other suitable information, or any combination thereof. The timestamping management application may access various sources of information (e.g., sensor information 404, network information 406, GPS information 408, related photograph information 414, any other suitable information 416, or any combination thereof) to identify an estimate of the time of day the photograph was taken. For example, the timestamping management application may determine that the photograph is illuminated with sunlight (e.g., color temperature=6500 K). The timestamping management application may use the color temperature information to identify an estimate of the time of day the photograph was taken (e.g., during daylight hours). The timestamping management application may compare the estimate with the initial time and determine that the initial time associated with the photograph does not correspond to the time the photograph was taken. In another example, the timestamping management application may access user location information (e.g., calendar information 410, location-based social network information 412) to identify where or when the photograph was taken (e.g., location, time zone). The timestamping management application may use the user location information to provide a location estimate of the time of day the photograph was taken (e.g., a UTC offset). For example, user location information may be indicative of a travel event (e.g., "Trip to London, Jan. 1-5, 2010," "I am in London! (posted on 1/2/2010 at 8:00 pm GMT)," any other suitable information, or any combination thereof). The timestamping management application may compare the location estimate (e.g., "London, England," "Greenwich Mean Time (UTC+0)") with the initial time data (e.g., "Cupertino, Calif.," "Pacific Standard Time (UTC-8)") and determine that the initial time associated with the photograph (e.g., "3:12 pm," nighttime) does not correspond to the time the photograph was taken (e.g., daytime) based on the color temperature information, user location information, any other suitable information, or any combination thereof. The timestamping management application may generate a revised time (e.g., "11:12 am") based on the information used to identify the time that the photograph was taken (e.g., color temperature, user location information) and, in some embodiments, provide the information in revised timestamp region 516.

In some embodiments, input device 106, input device 214, or both may be used to select a timestamp to associate with the photograph (e.g., initial timestamp region 514, revised timestamp region 516). The selected timestamp region may be, for example, highlighted, have a different color, have a different font, be associated with a graphic icon, be differentiated in any other suitable manner, or any combination thereof.

In some embodiments, input device 106, input device 214, or both may be used to select automatic revision checkbox 518. The timestamping management application may provide the ability to associate a revised time with a photograph in the absence of a confirmation prompt in response to, for example, a user selecting (e.g., checking) automatic revision checkbox 518. The timestamping management application may provide the ability to require a confirmation prompt to associate a revised time with a photograph in response to, for example, a user selecting (e.g., unchecking) automatic revision checkbox 518.

In some embodiments, selectable icon 520 may provide access to additional information, instructions, or both associated with display screen 500. For example, the timestamping management application may provide access to various information used to identify the time a photograph was taken, determine that a timestamp associated with a photograph does not correspond to the time the photograph was taken, generate a revised time, perform any other suitable function, or any combination thereof in response to a user selecting selectable icon 520 using, for example, input device 106, input device 214, or both. In some embodiments, the timestamping management application may provide access to manipulate various settings and thresholds in response to a user selecting selectable icon 520 using, for example, input device 106, input device 214, or both.

In some embodiments, informational dialog 522 may display information associated with initial timestamp region 514, revised timestamp region 516, any other suitable information, or any combination thereof. Information provided by informational dialog 522 may include, for example, a filename (e.g., "filename12.jpg"), position in a set of photographs requiring confirmation prompts (e.g. "12 of 23"), any other suitable information, or any combination thereof. In some embodiments, initial timestamp region 514, revised timestamp region 516, or both may include informational dialog 522.

In some embodiments, informational display region 534 may display information associated with initial timestamp region 514, revised timestamp region 516, any other suitable information, or any combination thereof. Information provided by informational display region 534 may include, for example, an image (e.g., a thumbnail graphic), related images (e.g., next and previous photographs), a video, any other suitable information, or any combination thereof. In some embodiments, initial timestamp region 514, revised timestamp region 516, or both may include informational display region 534.

When affirmative confirmation option 530 is selected, for example, the timestamping management application may associate the selected timestamp (e.g., initial timestamp region 514, revised timestamp region 516) with the photograph. In some embodiments, the timestamping management application may associate the revised time with the photograph when affirmative confirmation option 530 is selected. For example, the timestamping management application may store the photograph and the revised time in modules 112, electronic storage 206, database 134, any other suitable electronic storage, or any combination thereof via any suitable communications path, network, or both in accordance with some embodiments of the present disclosure. In another example, processing equipment 102, 202, or both may adjust the time associated with the digital photograph based on the revised time and store the adjusted digital photograph in modules 112, electronic storage 206, database 134, any other suitable electronic storage, or any combination thereof via any suitable communications path, network, or both in accordance with some embodiments of the present disclosure. In some embodiments, the timestamping management application may store temporal information in any suitable storage device (e.g., modules 112, electronic storage 206, database 134) without receiving confirmation by the user.

When negative confirmation option 532 is selected, for example, the timestamping management application may not associate the revised time with the photograph. For example, the timestamping management application may store the photograph and the initial timestamp in modules 112, electronic storage 206, database 134, any other suitable electronic storage, or any combination thereof. In another example, the timestamping management application may delete information used in generating a revised time from any suitable storage device (e.g., modules 112, electronic storage 206, database 134), return the display screen to a non-confirmation state, or both in response to the user selecting, for example, negative confirmation option 532.

In some embodiments, display screen 500 may also include one or more display regions, one or more advertisements, one or more options regions, any other suitable region, or any combination thereof. In some embodiments, display screen 500 may be personalized in accordance with some embodiments of the present disclosure. It will be appreciated that the aforementioned features may be included in other display screens of the present disclosure.

Figure 6:
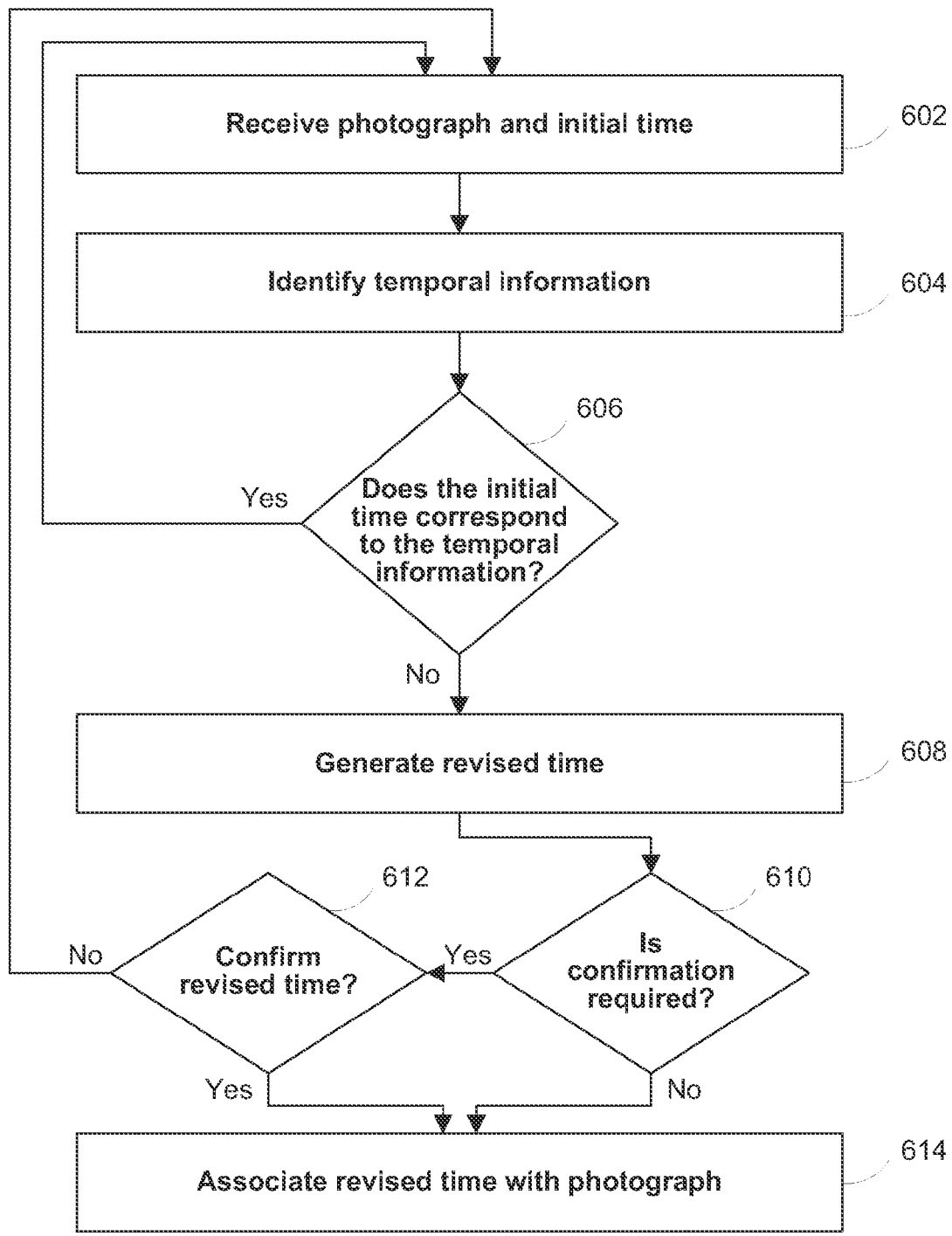
FIG. 6 is a flow chart of illustrative steps involved in identifying and revising the time a photograph was taken in accordance with some embodiments.

FIG. 6 is a flow chart of illustrative steps involved in identifying the time a photograph was taken and associating a revised time with the photograph when the initial time associated with the photograph does not correspond to the time the photograph was taken in accordance with some embodiments of the present disclosure. In some embodiments, user camera equipment 152, image capture device 218, user equipment 140, any other suitable component, or any combination thereof may be used to input a photograph using a timestamping management application which may be partially or wholly implemented on processing equipment 102, processing equipment 202, server 130, any other suitable component, or any combination thereof.

At step 602, the timestamping management application may receive a photograph and data representing an initial time associated with the photograph, such as a timestamp, through any suitable communications path, network, or both in accordance with some embodiments of the present disclosure.

At step 604, the timestamping management application may identify the time the photograph was taken. In some embodiments, the timestamping management may access user camera equipment 152, photo application 120, calendar application 122, server 130, database 134, any other suitable component, or any combination thereof via any suitable communications path to identify the time the photograph was taken using various information and weightings, such as information 404, 406, 408, 410, 412, 414, 416, any other suitable information, or any combination thereof received through any suitable communications path, network, or both in accordance with some embodiments of the present disclosure.

At step 606, the timestamping management application may determine if the initial time associated with a photograph corresponds to the time the photograph was taken. For example, processing equipment 402 compare a weighted sum or average of information 404, 406, 408, 410, 412, 414, 416, any other suitable information, or any combination thereof to a threshold value. In some embodiments, the timestamping management application may also evaluate error data associated with the information in computing the weighted sum or average. If the timestamping management application determines that the initial time associated with a photograph corresponds to the time the photograph was taken, the process may proceed to step 602. If the timestamping management application determines that the initial time associated with a photograph does not correspond to the time the photograph was taken, the process may proceed to step 608.

At step 608, the timestamping management application may generate a revised time based on the identified time that the photograph was taken, the determination that the time associated with a photograph does not correspond to the time the photograph was taken, any other suitable information, or any combination thereof in accordance with some embodiments of the present disclosure. For example, the timestamping management application may generate a revised time based on a time offset to the initial timestamp identified in, for example, step 604.

At step 610, the timestamping management application may determine if confirmation is required to associate the revised time with the photograph. In some embodiments, the timestamping management application may automatically associate a revised time with a photograph in the absence of any confirmation requirements. For example, the timestamping management application may not require confirmation in response to, for example, a user selecting (e.g., checking) automatic revision checkbox 518 using, for example, input device 106, input device 214, or both. In some embodiments, the timestamping management application may require confirmation to associate a revised time with a photograph. For example, the timestamping management application may require confirmation in response to, for example, a user selecting (e.g., unchecking) automatic revision checkbox 518 using, for example, input device 106, input device 214, or both. If the timestamping management application determines that confirmation is not required, the process may proceed to step 614. If the timestamping management application determines that determines that confirmation is required, the process may proceed to step 612.

At step 612, the timestamping management application may confirm whether to associate the revised time with the photograph. For example, the timestamping management application may provide confirmation prompt display screen 500 in response to processing equipment 402 determining that the initial time associated with the photograph does not correspond to the time the photograph was taken. If the timestamping management application has not received confirmation (e.g., by selecting negative confirmation option 532, by not receiving input after a predetermined time interval), the process may proceed to step 602. If the timestamping management application has received confirmation (e.g., by selecting affirmative confirmation option 530), the process may proceed to step 614.

At step 714, the timestamping management application may associate the revised time with the photograph. For example, the timestamping management application may store the photograph and the revised time in modules 112, electronic storage 206, database 134, any other suitable electronic storage, or any combination thereof via any suitable communications path, network, or both in accordance with some embodiments of the present disclosure. In another example, processing equipment 102, 202, or both may adjust the time associated with the digital photograph based on the revised time and store the adjusted digital photograph in modules 112, electronic storage 206, database 134, any other suitable electronic storage, or any combination thereof via any suitable communications path, network, or both in accordance with some embodiments of the present disclosure.

Figure 7:
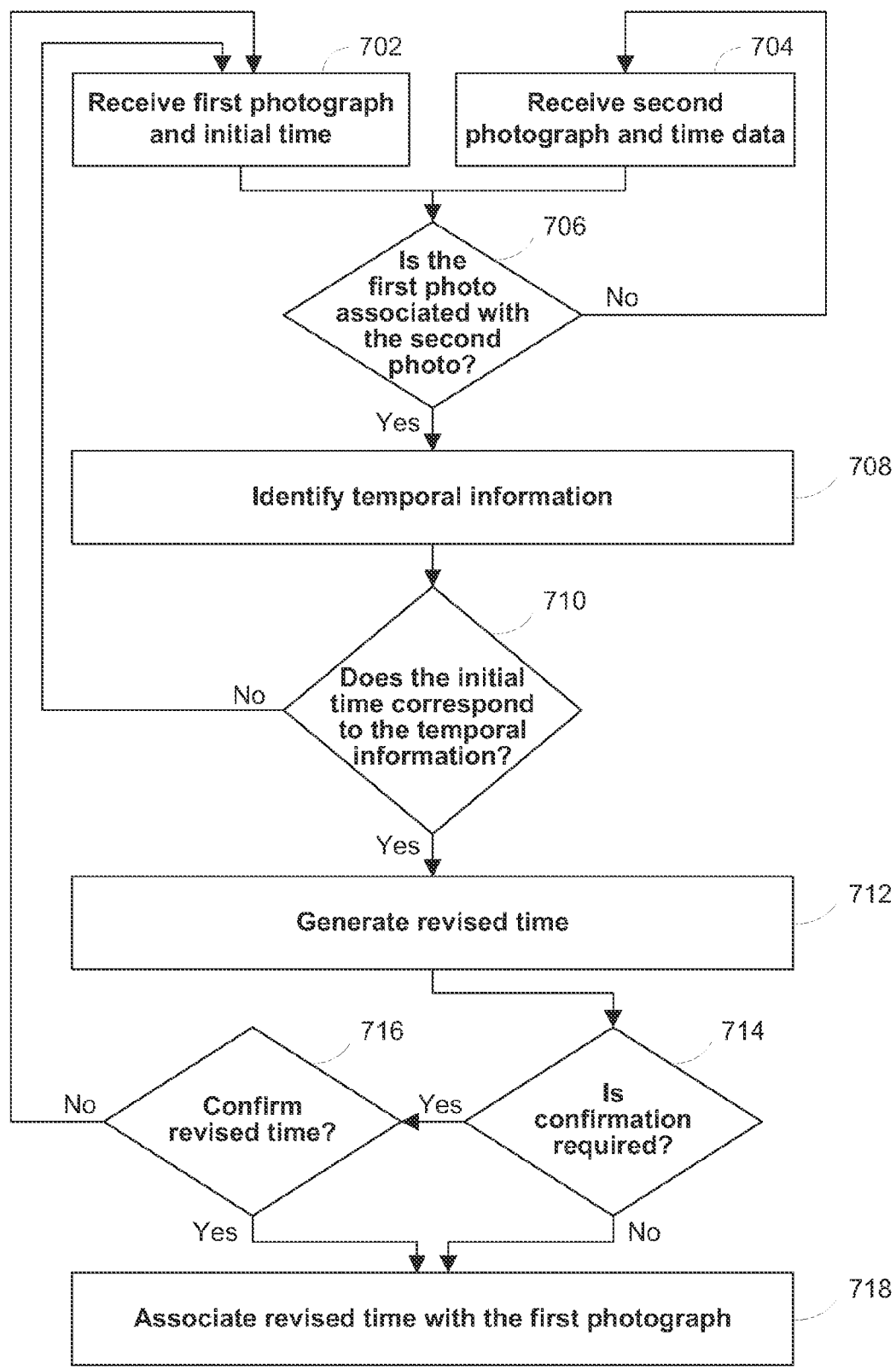
FIG. 7 is a flow chart of illustrative steps involved in identifying and revising the time a photograph was taken based on a related photograph in accordance with some embodiments.

FIG. 7 is a flow chart of illustrative steps involved in identifying the time a photograph was taken based on a related photograph and associating a revised time with the photograph when the initial time associated with the photograph does not correspond to the time the photograph was taken in accordance with some embodiments of the present disclosure. In some embodiments, user camera equipment 152, image capture device 218, user equipment 140, any other suitable component, or any combination thereof may be used to input a photograph and one or more related photographs using a timestamping management application which may be partially or wholly implemented on processing equipment 102, processing equipment 202, server 130, any other suitable component, or any combination thereof.

At step 702, the timestamping management application may receive a photograph and data representing an initial time associated with the photograph, such as a timestamp, through any suitable communications path, network, or both in accordance with some embodiments of the present disclosure.

At step 704, the timestamping management application may receive a second photograph and data representing the time the second photograph was taken, such as a timestamp, through any suitable communications path, network, or both in accordance with some embodiments of the present disclosure.

At step 706, the timestamping management application may determine if the photograph is associated with the second photograph. For example, processing equipment 402 compare a weighted sum or average of information 404, 406, 408, 410, 412, 414, 416, error data, any other suitable information, or any combination thereof to a threshold value for the photograph, second photograph, or both. For example, processing equipment 402 may determine that the photographs are related if they were taken at approximately the same time or if the time difference between the photographs is reflective of, for example, a calculated UTC offset. If the timestamping management application determines that the photographs are associated or otherwise related, the process may proceed to step 708. If the timestamping management application determines that the photographs are not associated or otherwise related, the process may proceed to step 708. In some embodiments, the process may proceed to step 702, step 604, termination, or any other suitable step if the timestamping management application determines that the photographs are not associated or otherwise related.

At step 708, the timestamping management application may identify the time the photograph was taken. In some embodiments, the timestamping management may access user camera equipment 152, photo application 120, calendar application 122, server 130, database 134, any other suitable component, or any combination thereof via any suitable communications path to identify the time the photograph was taken using various information and weightings, such as the time data of the second photograph, information 404, 406, 408, 410, 412, 414, 416, error data, any other suitable information, or any combination thereof received through any suitable communications path, network, or both in accordance with some embodiments of the present disclosure.

At step 710, the timestamping management application may determine if the initial time associated with a photograph corresponds to the time the photograph was taken. For example, processing equipment 402 compare a weighted sum or average of the time data of the second photograph, information 404, 406, 408, 410, 412, 414, 416, error data, any other suitable information, or any combination thereof to a threshold value. In some embodiments, the timestamping management application may also evaluate error data associated with the information in computing the weighted sum or average. If the timestamping management application determines that the initial time associated with a photograph corresponds to the time the photograph was taken, the process may proceed to step 712. If the timestamping management application determines that the initial time associated with a photograph does not correspond to the time the photograph was taken, the process may proceed to step 702.

At step 712, the timestamping management application may generate a revised time based on the identified time that the photograph was taken, the determination that the time associated with a photograph does not correspond to the time the photograph was taken, any other suitable information, or any combination thereof in accordance with some embodiments of the present disclosure. For example, the timestamping management application may generate a revised time based on the time that the second photograph was taken.

At step 714, the timestamping management application may determine if confirmation is required to associate the revised time with the photograph. In some embodiments, the timestamping management application may automatically associate a revised time with a photograph in the absence of any confirmation requirements. For example, the timestamping management application may not require confirmation in response to, for example, a user selecting (e.g., checking) automatic revision checkbox 518 using, for example, input device 106, input device 214, or both. In some embodiments, the timestamping management application may require confirmation to associate a revised time with a photograph. For example, the timestamping management application may require confirmation in response to, for example, a user selecting (e.g., unchecking) automatic revision checkbox 518 using, for example, input device 106, input device 214, or both. If the timestamping management application determines that confirmation is not required, the process may proceed to step 718. If the timestamping management application determines that determines that confirmation is required, the process may proceed to step 716.

At step 716, the timestamping management application may confirm whether to associate the revised time with the photograph. For example, the timestamping management application may provide confirmation prompt display screen 500 in response to processing equipment 402 determining that the initial time associated with the photograph does not correspond to the time the photograph was taken. If the timestamping management application has not received confirmation (e.g., by selecting negative confirmation option 532, by not receiving input after a predetermined time interval), the process may proceed to step 702. If the timestamping management application has received confirmation (e.g., by selecting affirmative confirmation option 530), the process may proceed to step 718.

At step 718, the timestamping management application may associate the revised time with the photograph. For example, the timestamping management application may store the photograph and the revised time in modules 112, electronic storage 206, database 134, any other suitable electronic storage, or any combination thereof via any suitable communications path, network, or both in accordance with some embodiments of the present disclosure. In another example, processing equipment 102, 202, or both may adjust the time associated with the digital photograph based on the revised time and store the adjusted digital photograph in modules 112, electronic storage 206, database 134, any other suitable electronic storage, or any combination thereof via any suitable communications path, network, or both in accordance with some embodiments of the present disclosure.

It will be understood that the foregoing is only illustrative of the principles of the disclosure, and that the disclosure may be practiced by other than the described embodiments, which are presented for purposes of illustration and not of limitation.

What is claimed is:

1. A method for timestamping a digital image, the method comprising:
    receiving a first digital image of a first scene, the first digital image including first image data representing the first scene and a first metadata, the first metadata representing at least an initial time associated with capture of the first digital image;
    storing the received first digital image in a memory;
    analyzing the first image data to identify one or more characteristics having visual information contained within the first scene, the one or more characteristics being indicative of when the first digital image was captured;
    determining a revised time of the first digital image from a time determination weighted combination of the one or more characteristics; and
    updating the first digital image's memory so as to update the first metadata to associate the revised time with the first digital image when the initial time does not correspond to the revised time.

2. The method of claim 1, wherein at least one of the one or more characteristics is indicative of a particular relative time period during a day when the first digital image was captured.

3. The method of claim 2, wherein the particular relative time period comprises one of dawn, day, dusk and night.

4. The method of claim 1, wherein at least one of the one or more characteristics is indicative of whether the first digital image was captured in one of outdoors and indoors.

5. The method of claim 1, wherein determining the revised time from the time determination weighted combination further includes at least one weighted camera setting associated with the first digital image in establishing the weighted calculation for time determination.

6. The method of claim 1, wherein determining a revised time further comprises:
    accessing an electronic database of information related to an electronic calendar; and
    determining the revised time from the time determination weighted combination of the one or more characteristics and further including the information from the electronic calendar.

7. The method of claim 1, wherein updating-comprises comparing the time determination weighted combination with a threshold value.

8. The method of claim 1 further comprising:
    receiving a second digital image, the second digital image including second image data and second metadata, the second metadata representing at least a time of the second image's capture, wherein analyzing the first image data to identify the one or more characteristics indicative of when the first digital image was captured is based at least in part on the second image's capture time; and
    updating the memory so as to update at least one of the first metadata and the second metadata to indicate the second digital image is associated in time with the first digital image.

9. The method of claim 1, wherein determining the revised time from the time determination weighted combination further includes weighting information from at least one sensor.

10. The method of claim 9, wherein the at least one sensor includes at least one of an ambient light sensor, a color temperature sensor, an infrared sensor, an ultraviolet sensor, a metering sensor, a motion sensor, a temperature sensor, and an audio sensor.

11. The method of claim 1, further comprising evaluating error data associated with the one or more characteristics in establishing the time determination weighted combination.

12. A system for timestamping a digital image, the system comprising:
    at least one communications interface configured to receive a first digital image, the first digital image including first image data and a first metadata, the first metadata representing at least an initial time associated with capture of the first digital image;
    memory, coupled to the at least one communications interface, the memory configured to store the first digital image; and
    electronic processing equipment coupled to the at least one communications interface and the memory, the electronic processing equipment configured to execute instructions stored in the memory to cause the electronic processing equipment to:
        analyze the first image data to identify one or more characteristics of visual information contained within the first scene, the one or more characteristics being indicative of when the first digital image was captured,
        determine a revised time from a weighted time calculation of the one or more characteristics, and
        update the first digital image's memory so as to update the first metadata to associate the revised time with the first digital image when the initial time does not correspond to the revised time.

13. The system of claim 12, wherein at least one of the one or more characteristics is indicative of a particular relative time period during a day when the first digital image was captured.

14. The system of claim 12, wherein at least one of the one or more characteristics is indicative of a color temperature of the first digital image.

15. The system of claim 12, wherein at least one of the one or more characteristics is indicative of whether the first digital image was captured in one of outdoors and indoors.

16. The system of claim 12, wherein the instructions to cause the electronic processing equipment to weight at least one camera setting associated with the first digital image to determine the weighted time calculation.

17. The system of claim 12, wherein the instructions to cause the electronic processing equipment to determine the revised time comprise instructions to cause the electronic processing equipment to determine the revised time from the weighted time calculation of the one or more characteristics and further including electronic calendar information.

18. The system of claim 12, wherein the instructions to cause the electronic processing equipment to update the first digital image's memory comprise instructions to cause the electronic processing equipment to update the first digital image's memory so as to update the first metadata to associate the revised time with the first digital image is based at least on a comparison between the weighted time calculation and a threshold value.

19. The system of claim 18, wherein the instructions to cause the electronic processing equipment to update comprise instructions to cause the electronic processing equipment to update the first digital image's memory so as to update the first metadata to associate the revised time with the first digital image when the initial time does not correspond to the revised time and further based at least in part on a time that a second digital image was captured.

20. The system of claim 12, further comprising one or more sensors coupled to the electronic processing equipment, wherein the instructions to cause the electronic processing equipment to determine the weighted time calculation of the one or more characteristics and weighting input from at least one sensor.

21. The system of claim 20, wherein the one or more sensors includes at least one of an ambient light sensor, a color temperature sensor, an infrared sensor, an ultraviolet sensor, a metering sensor, a motion sensor, a temperature sensor, and an audio sensor.

22. The system of claim 12, wherein the instructions further causes the electronic processing equipment to evaluate error data associated with the one or more characteristics in establishing the weighted time calculation.

* * * * *